(12) United States Patent
Blackburn (10) Patent No.: US 7,210,255 B2
(45) Date of Patent: May 1, 2007

(54) PADDED LICENSE PLATE SCREW

(76) Inventor: Norman G. Blackburn, 12206 Ashton Glen Ct., Richmond, VA (US) 23233

( * ) Notice: Subject to any disclaimer, the term of this patent is extended or adjusted under 35 U.S.C. 154(b) by 0 days.

(21) Appl. No.: 11/129,446

(22) Filed: May 16, 2005

(65) Prior Publication Data

US 2005/0210721 A1   Sep. 29, 2005

Related U.S. Application Data (63) Continuation-in-part of application No. 10/765,112, filed on Jan. 28, 2004, now abandoned.

(51) Int. Cl.
G09F 7/00 (2006.01)
(52) U.S. Cl. ........................................... 40/209
(58) Field of Classification Search ................. 40/200, 40/201, 202, 209, 712; 16/86 R, 85
See application file for complete search history.

(56) References Cited

U.S. PATENT DOCUMENTS

| | | | |
|---|---|---|---|
| 2,054,060 A * | 9/1936 | Morris | 411/5 |
| 2,944,367 A | 7/1960 | Bontecue | |
| 3,484,891 A | 12/1969 | Borgen | |
| 3,693,495 A | 9/1972 | Wagner | |
| 3,885,492 A * | 5/1975 | Gutshall | 411/373 |
| 3,969,786 A * | 7/1976 | Peak | 16/86 A |
| 4,041,834 A | 8/1977 | Herkes | |
| 4,136,598 A | 1/1979 | Hughes | |
| 4,482,278 A | 11/1984 | Dorn | |
| 4,813,833 A | 3/1989 | Haab | |
| 4,924,661 A * | 5/1990 | Seymour | 56/1 |
| 5,122,021 A | 6/1992 | Medal | |
| 5,381,618 A | 1/1995 | Singleton | |
| 5,428,911 A * | 7/1995 | Figone et al. | 40/209 |
| 5,651,651 A | 7/1997 | Spencer | |
| 5,941,567 A | 8/1999 | Wickenheiser | |
| 6,295,697 B1 | 10/2001 | Simon | |
| 6,315,485 B1 | 11/2001 | Speck et al. | |
| 6,430,775 B1 | 8/2002 | Bushey | |
| 6,475,094 B1 | 11/2002 | Bruns et al. | |
| 6,519,882 B1 | 2/2003 | Shuen | |
| 6,676,351 B1 | 1/2004 | Bruns | |

FOREIGN PATENT DOCUMENTS

GB    2173564 A  * 10/1986

* cited by examiner

*Primary Examiner*—Cassandra Davis
(74) *Attorney, Agent, or Firm*—Richard C. Litman (57) ABSTRACT

The padded license plate screw is a single piece screw with a force-dispersing pad permanently attached to the head. The padded license plate screw is designed specifically to replace license plate bolts and used to prevent or minimize bumper damage that would otherwise be caused by license plate bolts in low-impact collisions. In an additional embodiment, a plurality of padded screws are integrally incorporated into a padded license plate frame. The padded license plate screws cushion the bumper to minimize damage from collision.

13 Claims, 7 Drawing Sheets

PADDED LICENSE PLATE SCREW

CROSS-REFERENCE TO RELATED APPLICATIONS

This application is a continuation-in-part of application Ser. No. 10/765,112 filed on Jan. 28, 2004 now abandoned.

BACKGROUND OF THE INVENTION

1. Field of the Invention

The present invention relates to bumper protection devices, and particularly to a padded license plate screw designed to prevent small nicks in plastic bumpers from license plate bolts in low-speed collisions.

2. Description of the Related Art

Many automobile manufacturers today value aesthetics above collision protection when deciding automobile bumper design and construction. An increase in demand for contemporary, trendy bumpers combined with a gradual relaxing of federal standards regarding bumper collision requirements have led to the use of plastic bumper covers replacing chrome bumpers. Stylish plastic bumper covers have a greater appeal to customers. Plastic can be painted to match the body color and has a more modern look than chrome. It also weighs less than chrome or metal, thereby decreasing the weight of the vehicle and increasing the vehicle's fuel efficiency level. However, when it comes to damage control plastic has a costly disadvantage. To repair a small ding or nick in a textured plastic bumper cover will require total replacement of the bumper. Similar damage to a flat plastic bumper can be repaired and repainted.

In many states vehicle owners are required to attach license plates to both the front and rear end of the vehicle. The metal bolts used to fasten license plates to the vehicle are notorious for making costly puncture dings in plastic bumper covers, especially in high traffic areas and particularly during rush hour. When stop and go traffic is prevalent, there are a high number of low-impact bumper-to-bumper taps. Such damaging taps may also occur when the driver makes a miscalculation while parking. These taps cost owners an estimated average of Three Hundred to Five Hundred Dollars in total repair costs, not including lost work time and rental car expenses. High end vehicle repairs, such as for a Jaguar or Mercedes Benz, can average from Five Hundred to Twelve Hundred Dollars.

There is a need for a device that will minimize or eliminate the damage done from nicks from license plates screws in low speed collisions. Many of the small puncture marks and nicks caused by license plate screws in such collisions could be avoided if there were some type of cushion between the screws on the moving vehicle and the plastic bumper of the stationary vehicle to absorb and disperse the force of the impact. The padded license plate screw provides such a cushion. The invention is designed to be small and unobtrusive, yet efficient in shielding the opposing bumper from the potential costly damage of a license plate bolt puncture.

There are several different types of license plate covers and screw caps conventionally available. Most, for example, screw caps designed with plastic or metallic emblems or icons, are designed for stylish purposes instead of damage reduction purposes. There are also various covered screws in other arts, such as rubber support screws for furniture. However, such devices are not designed to address the specific problem solved by this invention.

U.S. Pat. No. 2,944,367 issued Jul. 12, 1960 to F. C. Bontecue describes a specially constructed support structure to stabilize a table, cabinet, or similar appliance. The invention includes a cylindrical, hollow, flexible cap attached to the top of a rivet. The cap contains a boss that separates the appliance from the top portion of the cap. The boss is attached to a web that bends when there is a disproportionate amount of weight above that particular corner of the appliance, thereby leveling the appliance.

U.S. Pat. No. 3,693,495, issued Sep. 26, 1972 to D. P. Wagner describes a screw and washer encapsulated by a molded plastic fastener. The plastic fastener is designed to withstand high torque levels without stripping from the metal. The fastener's purpose is to provide an efficient way to coordinate colors of fasteners with other components of the particular construction.

U.S. Pat. No. 4,041,834, issued Aug. 16, 1977 to D. J. Herkes discloses another plastic headed fastener. The invention features a quad-post design aiming to be capable of accepting high torque or high impact driving such that it may be drilled or tapped without damaging or stripping the plastic cap.

U.S. Pat. No. 4,813,833, issued Mar. 21, 1989 to A. D. Haab describes a metal threaded fastener with a polypropylene jacket covering the head and metal protuberances extending partially through the jacket. The fastener is designed for outdoor use, primarily in the construction of storage bins. The metal protuberances allow the bin assembler to hear a metal-to-metal sound when the fastener has been completely tightened in to prevent over-tightening and subsequent damage to the polypropylene jacket.

Other patents showing license plate screws or covered screws include U.S. Pat. No. 6,519,882 issued Feb. 18, 2003 to S. T. Shuen (decorative license plate frame structure); U.S. Pat. No. 4,482,278 issued Nov. 13, 1984 to J. D. Dorn (bolt with a plastic covering over the head with openings in the covering for sharp projections from the head to pass through); and U.S. Pat. No. 5,381,618 issued Jan. 17, 1995 to R. L. Singleton (security frame for vehicle license plates for preventing or increasing the difficulty of theft of license plates).

None of the above inventions and patents, taken either singly or in combination, is seen to describe the instant invention as claimed. Thus, a padded license plate screw solving the aforementioned problems is desired.

SUMMARY OF THE INVENTION

The padded license plate screw is a single piece screw with a force-dispersing pad permanently attached to the head. The padded license plate screw is designed specifically to replace license plate bolts and is used to prevent or minimize bumper damage that would otherwise be caused by license plate bolts in low-impact collisions.

The present invention also extends to a padded license plate frame having padded license plate screws or bolts incorporated or integrated into the frame. The frame itself may be made of a resilient material, such as neoprene, or may have a plastic face and a resilient backing made of foam rubber or neoprene. Resilient padded caps are provided for the screws that secure the frame to the license plate mounting bracket. The padded caps may be molded into the frame, or secured thereto by adhesive. The screw or bolt head is embedded in the padded cap, and may be a slotted head, a Phillips head, a Torx® head, or a hexagonal head. The padded cap may have any desired shape, e.g., a conical cap, a pyramidal cap, or a collapsible cap having a frustoconical head connected to a toroidal shoulder by a cylindrical neck.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
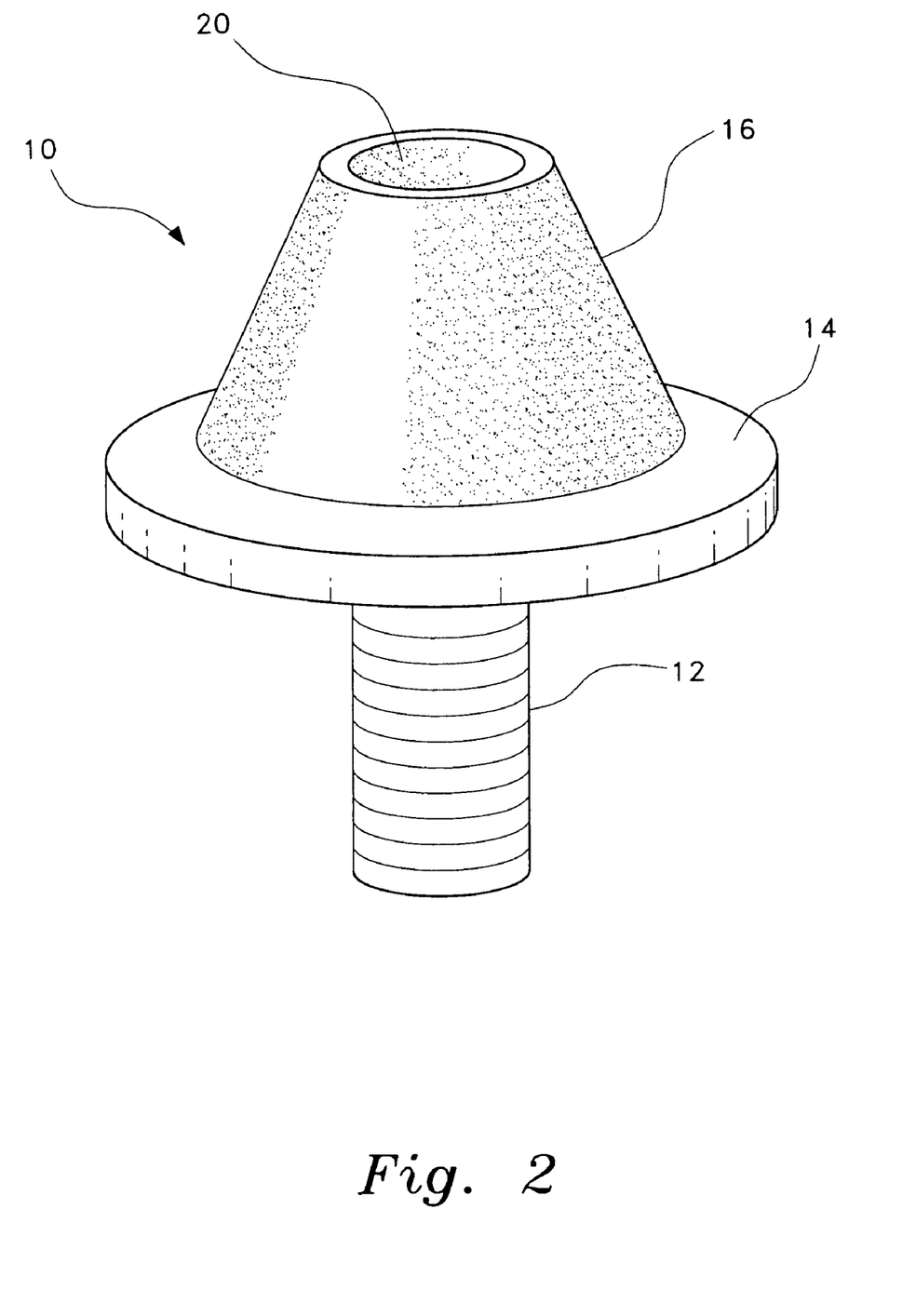
FIG. 2 is a perspective view of a padded license plate screw according to the present invention.

The present invention is a padded license plate screw, designated generally as 10 in the drawings. The padded license plate screw 10 is designed to prevent or decrease automobile bumper damage due to license plate bolts in low impact collisions. Referring first to FIG. 2, the padded license plate screw includes a screw 12, a padding or cushion cap 16 with an axial bore 20 defined therein, and a platform 14 for attaching the cap to the screw. The shank of the screw 12 should be the same size as that of a standard license plate bolt. The type of screw 12 is not critical, and may be any of various types, such as, but not limited to, a flathead screw, as shown in the embodiment in FIG. 3, roundhead screw, as shown in the embodiment in FIG. 4, or a Phillips head screw. The screw 12 should be constructed of some type of corrosion-resistant metal or galvanized metal, or may be made of nylon or other corrosion-resistant synthetic material.

Figure 3:
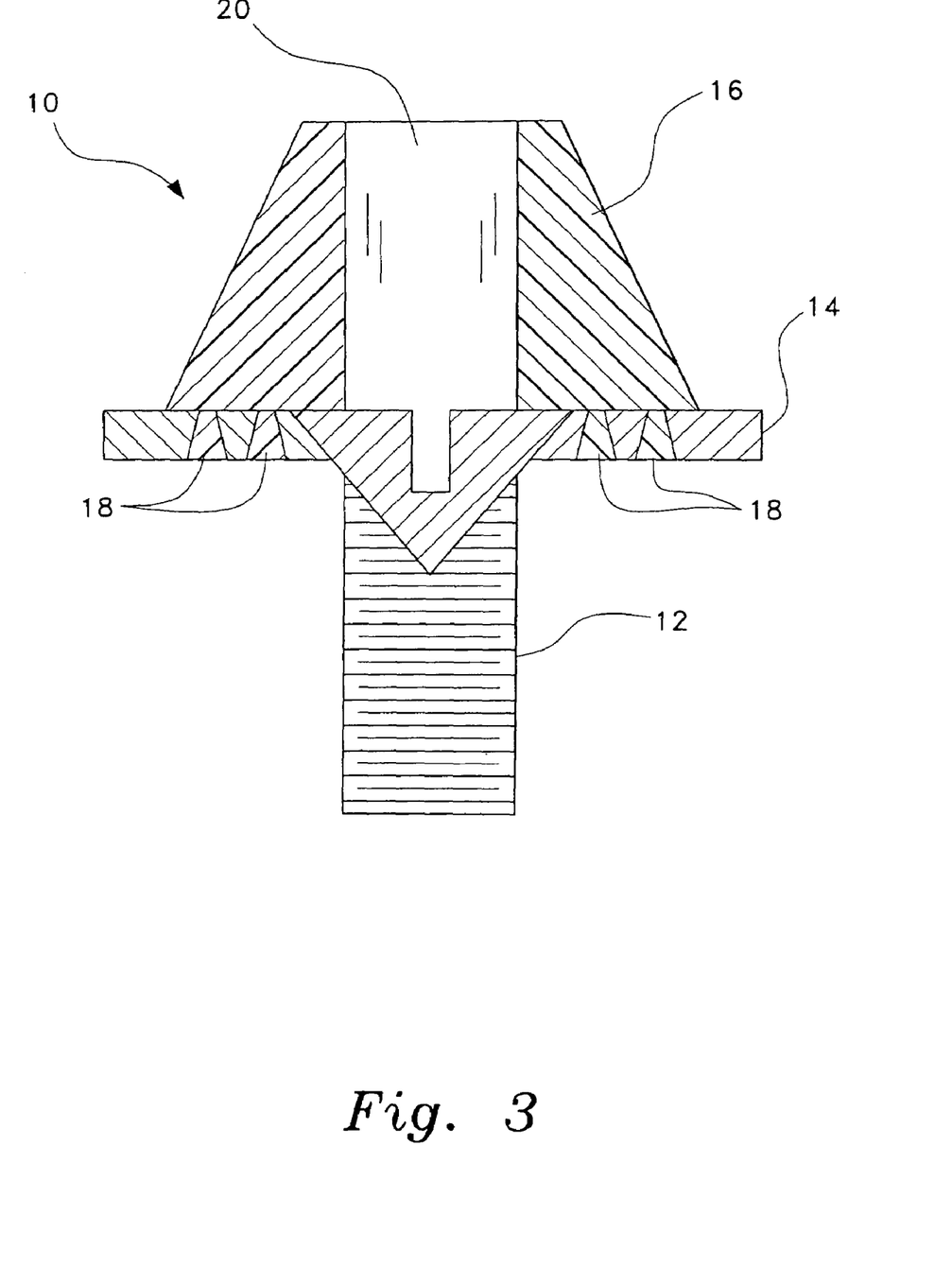
FIG. 3 is a side view in section of a padded license plate screw according to the present invention with a flathead screw.

The platform 14 may be constructed in a number of ways. The preferred embodiment, as shown in FIG. 3, uses a perforated washer 14 placed under the head of the screw 12. An alternative embodiment, shown in FIG. 5, uses a flathead screw with a head having an extended radius. In either or any case, the platform 14 must be of sufficient size to secure the rubber pad 16 and should be either firmly attached to the screw or a part of the screw itself.

In the embodiments shown in FIGS. 1–5 the shape for the cap 16 is conical, but the shape of the cap 16 is not critical. The scope of the present invention extends to any of various shapes or sizes including, but not limited to, cylindrical, rectangular, hexagonal, conical, or any custom or hybrid designs.

Any elastic but firm material capable of absorbing the force of a low-impact collision and returning to its original state may be used in construction of the cap 16. The preferred material is neoprene rubber, as it is a strong and resilient material and resists degradation from outdoor elements, such as extended exposure to sunlight or rain.

Figure 4:
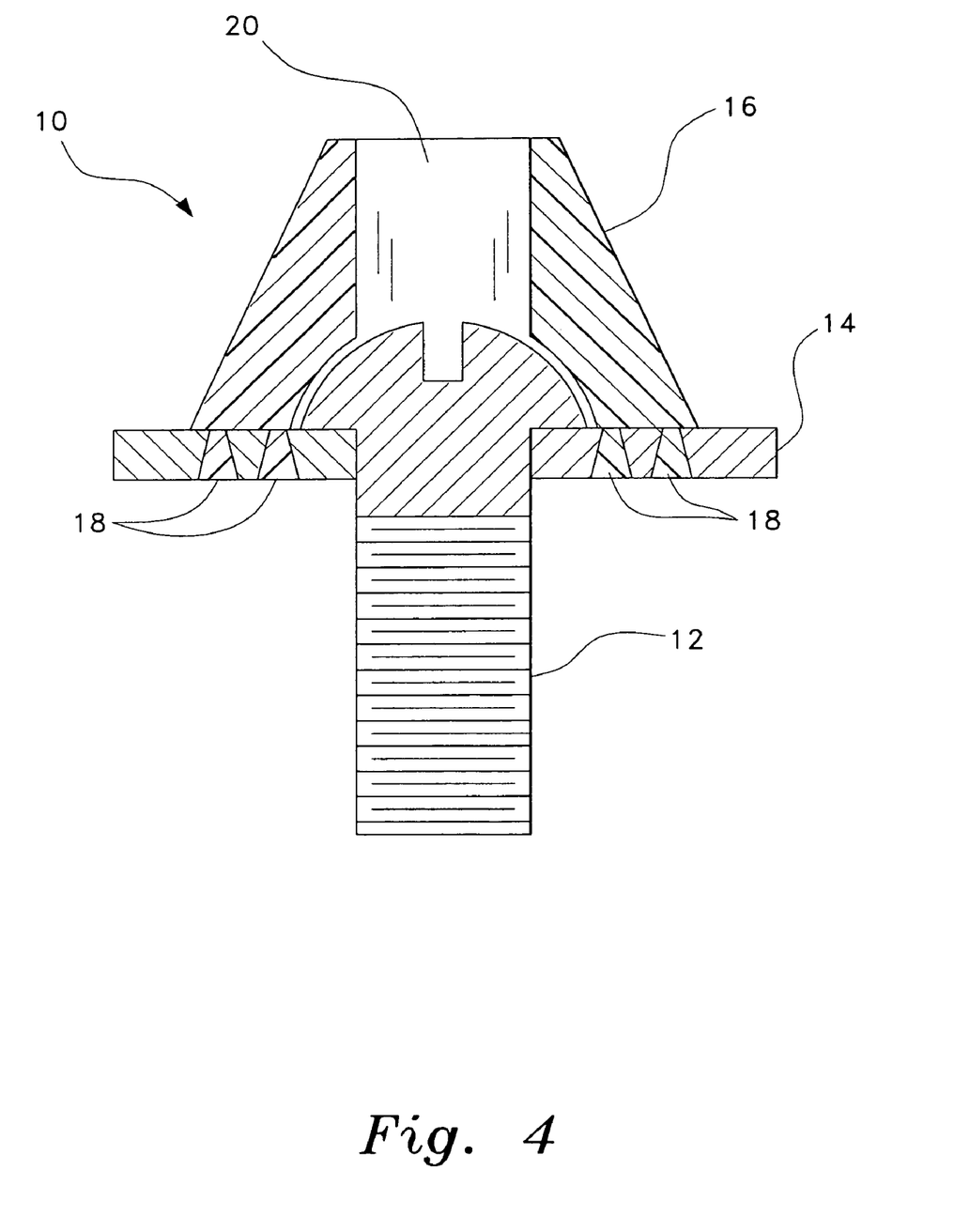
FIG. 4 is side view in section of a padded license plate screw according to the present invention with a round head screw.
Figure 5:
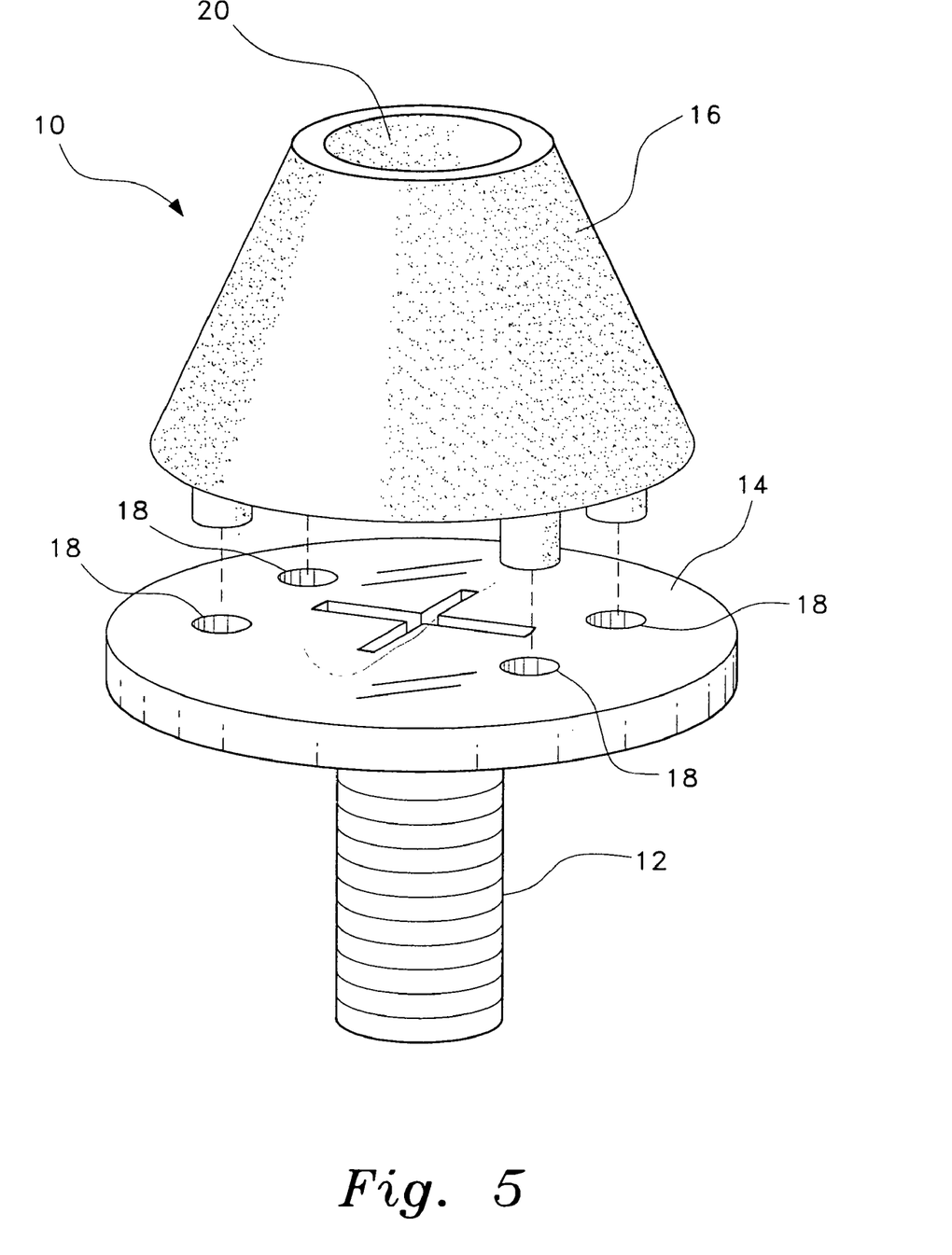
FIG. 5 is an exploded perspective view of an embodiment of a padded license plate screw according to the present invention with the cap removed and showing the extended head of the screw.

The cap 16 must be firmly attached to the support 14. This may be accomplished in any of several various ways, including, but not limited to, use of an adhesive or the hole-filling method employed in the preferred embodiment as shown in FIGS. 3–5. Using the hole-filling method, tapered holes 18 having a frusto-conical shape are drilled into the support 14. The cap 16 material is poured into a mold in liquid form and permitted to harden, forming protrusions securing the cap 16 to the support 14.

Figure 1:
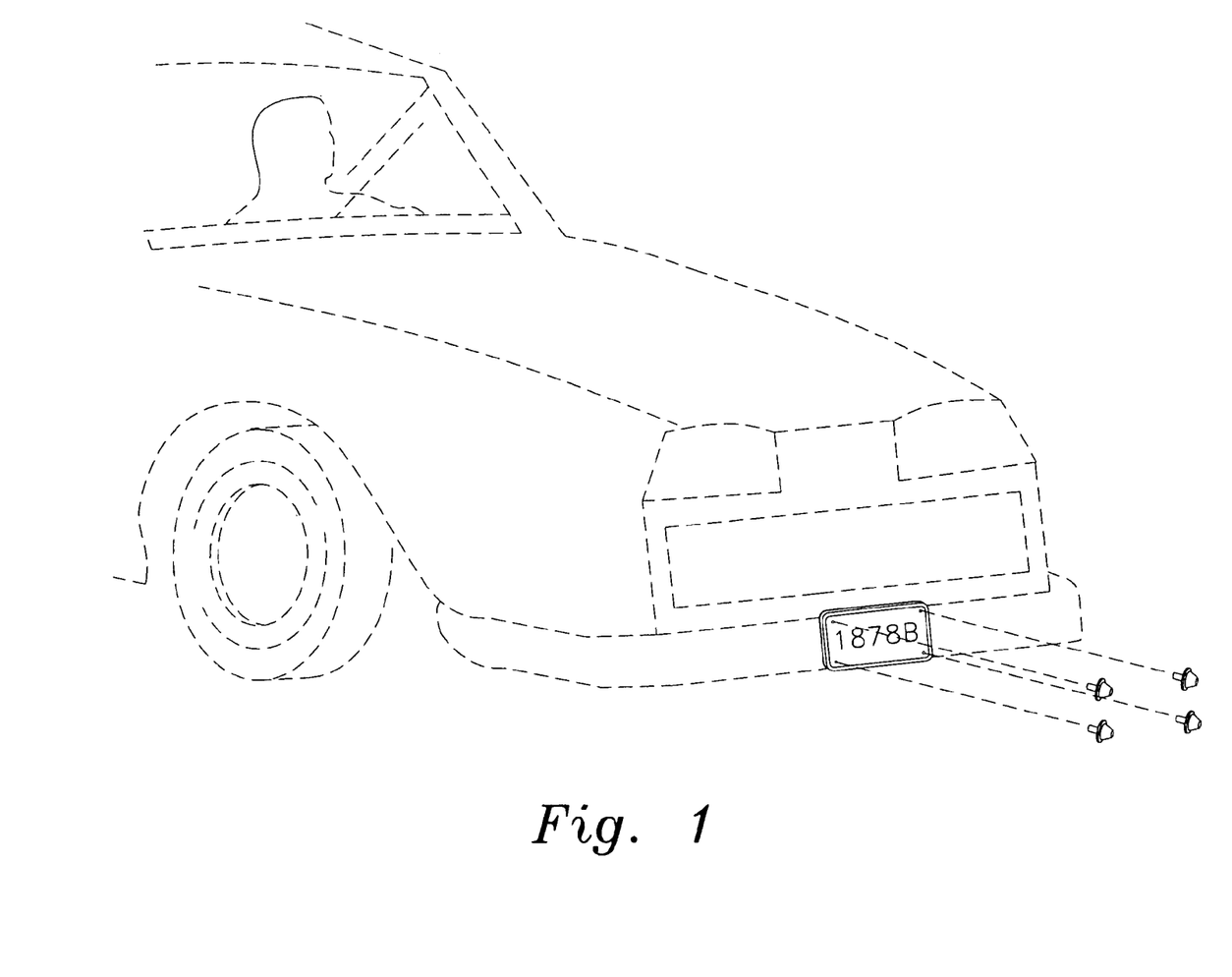
FIG. 1 is an environmental, perspective view of a padded license plate screw according to the present invention.

The cap 16 has an axial bore 20 centrally aligned above the head of the screw 12, as shown in FIGS. 3–4. The bore 20 allows a screw-driving device to reach the head of the screw 12 so that the padded license plate screw 10 can be screwed in to secure a license plate to a car bumper, as shown in FIG. 1.

Figure 6:
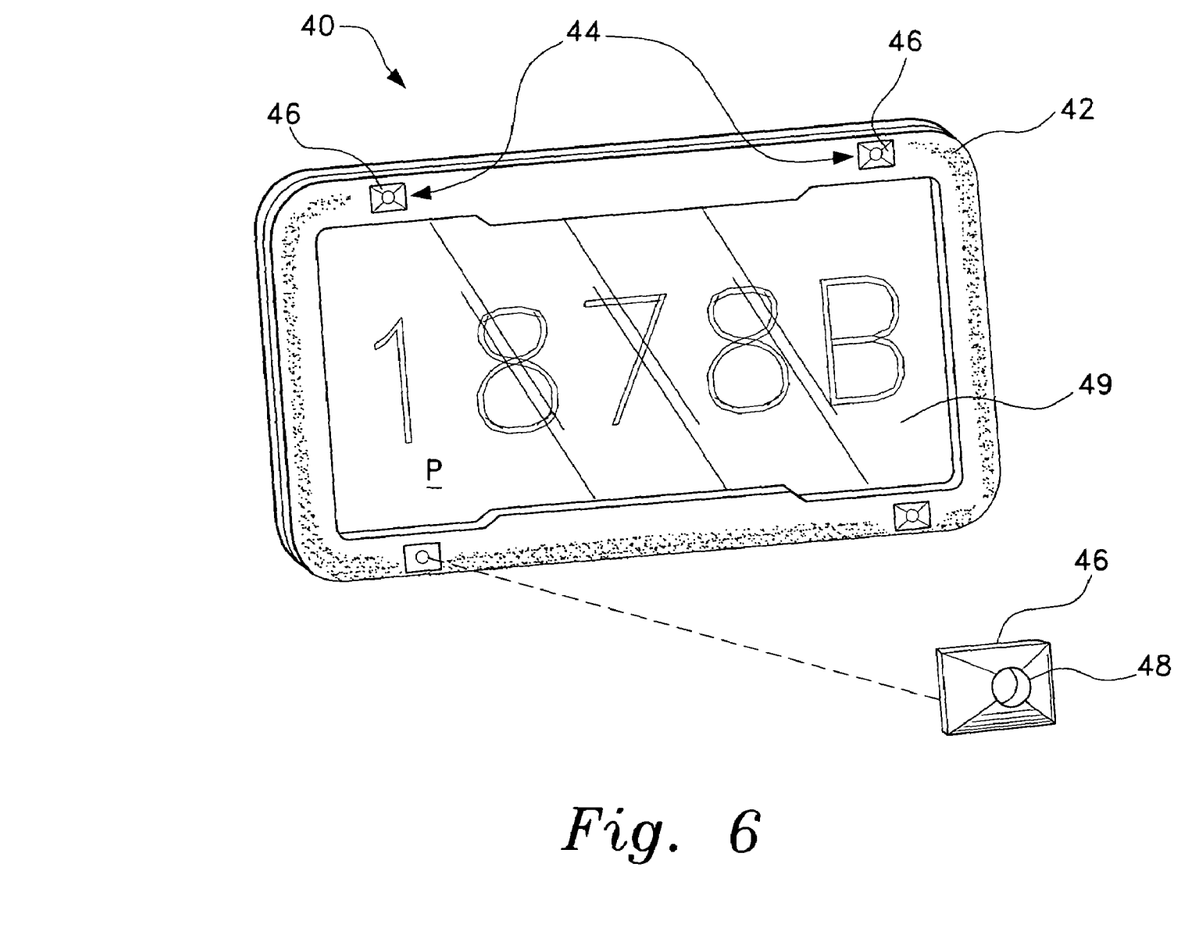
FIG. 6 is an environmental perspective view of a padded license frame according to the present invention with a screw cap exploded from the frame to show details thereof.

FIG. 6 shows an environmental perspective view of a license plate frame having padded license plate screws formed integrally therewith. The padded license plate frame 40 has a padded perimeter border or frame 42 and a plurality of padded screws 44 disposed along the frame 42. Each of the screws 44 has a cap 46 made of resilient material enclosing the head of the screw 44. The cap 46 may have a conical shape, a pyramidal shape (as shown in FIG. 6), or any other shape that allows for the cap 46 of the screw 44 to protrude from the front face of the frame 42. The frame 42 is designed to replace traditional license plate frames. The frame 42 is adapted to support a license plate P within the frame 42, and has the conventional lip or flanges on the rear face for retaining the plate P therein, the frame 42 surrounding the perimeter of the license plate P. The frame 42 may include a transparent sheet or cover 49 made from plastic that overlies the plate P to prevent the plate P from being soiled from exposure to the elements and debris or mud kicked up by traffic. The frame 42 may be made from neoprene or from any type of padded material compressible upon impact. Alternatively, the frame 42 may have a front face made from plastic with a rear layer or backing made from neoprene or foam rubber to provide a cushion upon impact.

FIG. 6 shows one of the caps 46 exploded from the frame 42 in order to show the pyramidal shape of the cap 46. Preferably the caps 46 are formed in one piece with the frame 42 by molding the caps 46 and the frame 42 as a single unit. Alternatively, the caps 46 may be made integral with the frame 42 by permanent adhesive bonding, by ultrasonic bonding, by thermal bonding, or by any other technique known in the art. The caps 46 may be molded around the heads of the screws 44, or bonded over the heads of the screws 44, or the diameter of the bores 48 defined in the caps 46 may be tapered in such a manner that the screws 44 may be inserted through the bores 48, the upper end of the bores 48 resiliently closing over the heads of the screws 44 but remaining sufficiently patent to permit passage of a fastening tool into the bore 48 to fasten the screws 44 to the license plate mounting bracket or to the bumper, as appropriate.

Figure 7:
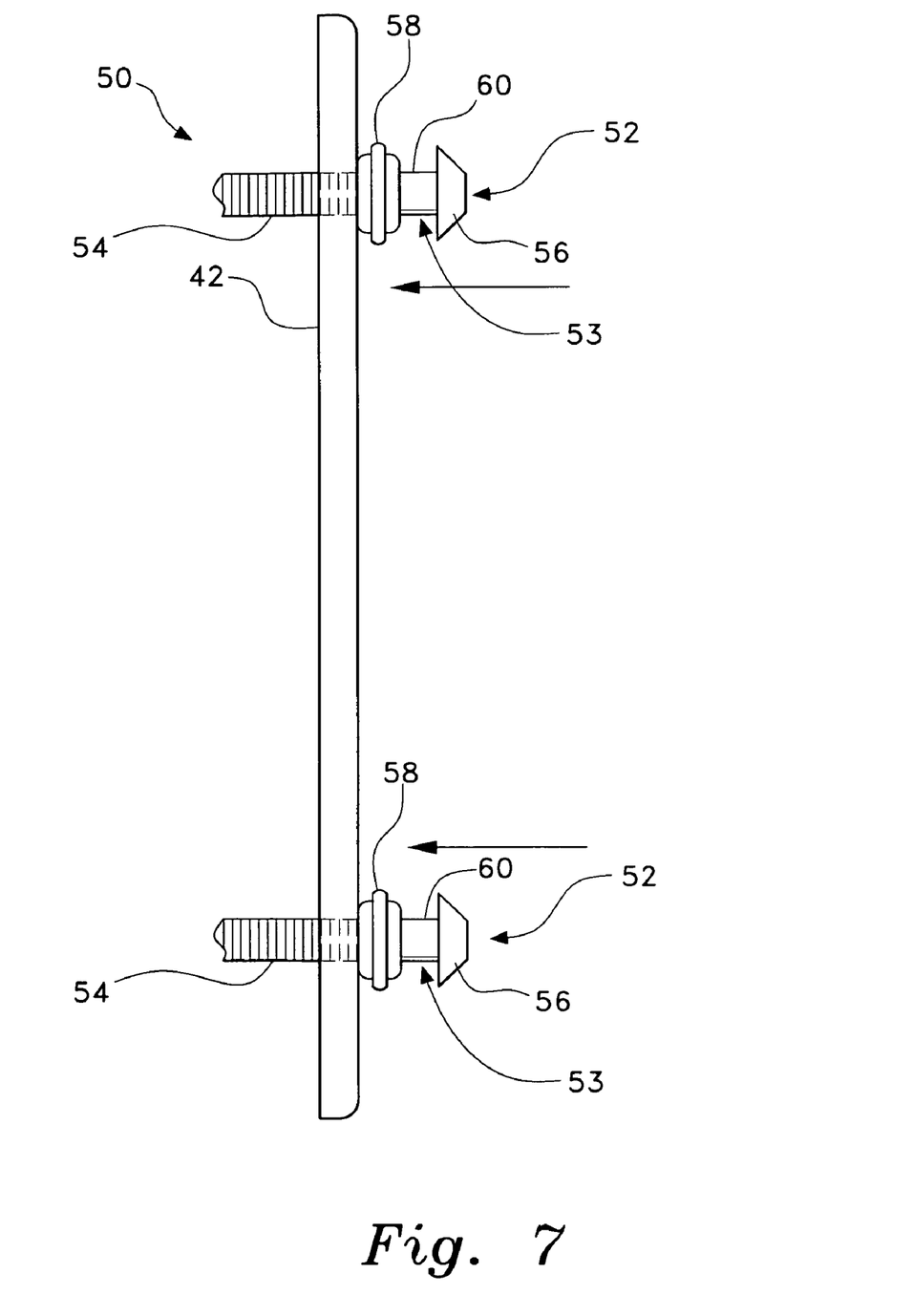
FIG. 7 is a side elevation view of a padded license plate frame according to the present invention showing an alternative collapsible screw cap.

Turning now to FIG. 7, a side view of a padded license plate frame 50 having screw caps of an alternate shape and construction is shown. The padded license plate frame 50 includes a padded peripheral border or frame 42 and a plurality of padded screws 52 integrally attached to the frame 42. The frame 42 may be made from a padded material (i.e., a resilient material, such as neoprene), or with a plastic face disposed upon a layer or backing of resilient material, such as foam rubber, in order to compress upon impact. The padded screws 52 each have a head embedded in a collapsible cap 53 and a threaded shank 54. The collapsible cap 53 has a frustoconical head 56, a toroidal shoulder 58 and a hollow, cylindrical neck 60 connecting the cap head 56 to the shoulder 58. The shoulder 58 of the collapsible cap 56 is affixed to the peripheral frame 42, either by being molded integrally therewith or by being permanently bonded thereto, as described above with respect to the pyramidal cap 46 of FIG. 6. The cap 53 also has an axial bore defined therein to permit access of a fastener tool, such as a screwdriver or wrench, to the head of the screw 54 in order to secure the frame 42 to a mounting bracket or bumper.

The caps 53 are made of resilient material and are collapsible, so that if an automobile backs into the automobile with the frame 42 disposed on the bumper, the head 56 of the cap 53 depresses against the shoulder 58. The neck 60 of the cap 53, being hollow and narrower in diameter than the head 56 or shoulder 60, facilitates collapse of the cap 53 upon impact.

Screws 44 and 54 may be made from corrosion-resistant metal, such as zinc, or from corrosion-resistant plastic material, such as nylon.

It is to be understood that the present invention is not limited to the embodiments described above, but encompasses any and all embodiments within the scope of the following claims.

I claim:

1. A padded license plate assembly, comprising:
a rectangular frame made from a resilient material and adapted for retaining a license plate, the frame defining a border surrounding the perimeter of a license plate;
a plurality of resilient screw caps integrally attached to the frame, each of the caps having an axial bore defined therein;
a plurality of license plate screws, each of the screws having a head engaging a corresponding one of the screw caps and a threaded shank extending from the frame, the axial bore being aligned with the head of the screw in order to provide access for a fastener tool for attaching the frame to an automobile;
wherein each of said screw caps comprises:
a toroidal shoulder attached integrally attached to said frame;
a frustoconically-shaped head; and
a hollow, cylindrical neck connecting the frustoconically-shaped head to the shoulder, the neck being smaller in diameter than said shoulder and a base of the frustoconically-shaped head, whereby said caps are adapted to collapse upon impact in a collision.

2. The padded license plate assembly according to claim 1, wherein the resilient material is neoprene rubber.

3. The padded license plate assembly according to claim 1, wherein each of the screw caps is pyramidal in shape.

4. The padded license plate assembly according to claim 1, wherein each of the screw caps is conical in shape.

5. The padded license plate assembly according to claim 1, wherein said screw caps and said frame are molded as a single piece.

6. The padded license plate assembly according to claim 1, wherein said screw caps are permanently bonded to said frame.

7. The padded license plate assembly according to claim 1, wherein said frame comprises a plastic front face bonded to a layer of resilient padding.

8. The padded license plate assembly according to claim 7, wherein said layer of resilient padding comprises foam rubber.

9. The padded license plate assembly according to claim 1, further comprising a transparent sheet of material mounted within said frame for covering the license plate.

10. A padded license plate assembly, comprising:
a rectangular frame adapted for retaining a license plate, the frame defining a border surrounding the perimeter of a license plate;
a plurality of resilient screw caps molded to the frame such that the frame and the screw caps are a single piece, each of the caps having an axial bore defined therein;
a plurality of license plate screws, each of the screws having a head engaging a corresponding one of the screw caps and a threaded shank extending from the frame, the axial bore being aligned with the head of the screw in order to provide access for a fastener tool for attaching the frame to an automobile.

11. A padded license plate assembly, comprising:
a rectangular frame adapted for retaining a license plate, the frame defining a border surrounding the perimeter of a license plate;
a plurality of resilient screw caps permanently bonded to the frame, each of the caps having an axial bore defined therein;
a plurality of license plate screws, each of the screws having a head engaging a corresponding one of the screw caps and a threaded shank extending from the frame, the axial bore being aligned with the head of the screw in order to provide access for a fastener tool for attaching the frame to an automobile.

12. A padded license plate assembly, comprising:
a rectangular frame having a plastic front face and bonded to a layer of resilient padding and adapted for retaining a license plate, the frame defining a border surrounding the perimeter of a license plate;
a plurality of resilient screw caps integrally attached to the frame, each of the caps having an axial bore defined therein;
a plurality of license plate screws, each of the screws having a head engaging a corresponding one of the screw caps and a threaded shank extending from the frame, the axial bore being aligned with the head of the screw in order to provide access for a fastener tool for attaching the frame to an automobile.

13. A padded license plate assembly, comprising:
a rectangular frame adapted for retaining a license plate, the frame defining a border surrounding the perimeter of a license plate;
a plurality of resilient screw caps integrally attached to the frame, each of the caps having an axial bore defined therein;
a plurality of license plate screws, each of the screws having a head engaging a corresponding one of the screw caps and a threaded shank extending from the frame, the axial bore being aligned with the head of the screw in order to provide access for a fastener tool for attaching the frame to an automobile;
wherein each of said screw caps comprises:
a toroidal shoulder attached integrally attached to said frame;
a frustoconically-shaped head; and
a hollow, cylindrical neck connecting the frustoconically-shaped head to the shoulder, the neck being smaller in diameter than said shoulder and a base of the frustoconically-shaped head, whereby said caps are adapted to collapse upon impact in a collision.

* * * * *